(12) United States Patent
Kida et al.

(10) Patent No.: US 12,546,905 B2
(45) Date of Patent: Feb. 10, 2026

(54) RADIATION IMAGING APPARATUS COMPRISING A FLUORESCENT MEMBER, A FLEXIBLE SUBSTRATE, A SUPPORT BASE, A CONTROL BOARD, AND AN INTERPOSED MEMBER BETWEEN THE FLEXIBLE SUBSTRATE AND THE SUPPORT BASE

(71) Applicant: CANON KABUSHIKI KAISHA, Tokyo (JP)

(72) Inventors: Akira Kida, Kanagawa (JP); Takaaki Gonda, Kanagawa (JP); Tomohiro Hoshina, Kanagawa (JP); Kaito Miyashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 18/493,611

(22) Filed: Oct. 24, 2023

(65) Prior Publication Data

US 2024/0142642 A1  May 2, 2024

(30) Foreign Application Priority Data

Oct. 27, 2022 (JP) ................. 2022-172600

(51) Int. Cl.
*A61B 6/42* (2024.01)
*G01T 1/20* (2006.01)

(52) U.S. Cl.
CPC ............ *G01T 1/20188* (2020.05); *A61B 6/42* (2013.01); *A61B 6/4208* (2013.01);
(Continued)

(58) Field of Classification Search
CPC ....... A61B 6/42; A61B 6/4208; A61B 6/4233; A61B 6/4266; A61B 6/4283; G01T 1/20;
(Continued)

(56) References Cited

U.S. PATENT DOCUMENTS

| 6,856,670 B2 * | 2/2005 | Hoheisel | G01T 1/20188 |
| | | | 257/E27.14 |
| 6,990,176 B2 * | 1/2006 | Sherman | A61B 6/4411 |
| | | | 378/161 |

(Continued)

FOREIGN PATENT DOCUMENTS

| JP | 2012216206 A | 11/2012 |
| JP | 2019184262 A | 10/2019 |

(Continued)

*Primary Examiner* — Allen C. Ho
(74) *Attorney, Agent, or Firm* — Canon U.S.A., Inc. IP Division

(57) ABSTRACT

A radiation imaging apparatus includes a radiation detection sensor, a support base, a bonding member, and a wiring member. The radiation detection sensor is configured to detect radiation and is formed using a flexible substrate. The support base supports radiation detection sensor. The bonding member bonds a first region of the radiation detection sensor to the support base. The first region is located in a central portion of the radiation detection sensor. The wiring member is connected to a predetermined edge portion of the radiation detection sensor. A second region is a region of the radiation detection sensor that includes the predetermined edge portion, and the second region opposes the support base but is not adhered to the support base.

15 Claims, 8 Drawing Sheets

(52) U.S. Cl.
CPC .......... *A61B 6/4266* (2013.01); *A61B 6/4283* (2013.01); *G01T 1/20182* (2020.05); *G01T 1/20186* (2020.05); *G01T 1/20187* (2020.05)

(58) Field of Classification Search
CPC . G01T 1/2006; G01T 1/2018; G01T 1/20182; G01T 1/20184; G01T 1/20186; G01T 1/20187; G01T 1/20188
USPC .......................... 250/370.09; 378/98.8, 189
See application file for complete search history.

(56) References Cited

U.S. PATENT DOCUMENTS

| | | | | |
|---|---|---|---|---|
| 7,495,226 B2* | 2/2009 | Jadrich | ..................... | G01T 1/20 250/370.09 |
| 8,581,202 B2* | 11/2013 | Yamada | .............. | G01T 1/20188 250/370.09 |
| 8,853,644 B2* | 10/2014 | Nakahashi | ........... | A61B 6/4283 250/394 |
| 9,140,809 B2* | 9/2015 | Nakahashi | .......... | G01T 1/20188 |
| 10,061,042 B2* | 8/2018 | Suzuki | ............... | G01T 1/20189 |
| 10,073,180 B2* | 9/2018 | Kobayashi | ............ | G01T 1/2006 |
| 10,261,197 B2* | 4/2019 | Ushikura | .............. | G01T 1/2023 |
| 10,451,503 B2* | 10/2019 | Kikuchi | .................... | G01T 1/00 |
| 10,488,534 B2* | 11/2019 | Kawaguchi | ........... | A61B 6/4283 |
| 10,690,789 B2* | 6/2020 | Horiuchi | .............. | G01T 1/2006 |
| 10,732,308 B2* | 8/2020 | Noguchi | ............. | G01T 1/2006 |
| 10,838,082 B2* | 11/2020 | Ushikura | .............. | G01T 1/2006 |
| 11,073,624 B2* | 7/2021 | Yamamoto | ............ | G01T 1/2006 |
| 11,221,421 B2* | 1/2022 | Iwakiri | ............... | G01T 1/20181 |
| 11,262,461 B2* | 3/2022 | Ushikura | ............ | G01T 1/20188 |
| 11,415,715 B2* | 8/2022 | Iwakiri | ............... | G01T 1/20188 |
| 11,428,827 B2* | 8/2022 | Ushikura | ................. | G01T 1/20 |
| 11,520,057 B2* | 12/2022 | Iwakiri | ............... | G01T 1/20188 |
| 11,520,061 B2* | 12/2022 | Kyushima | ........... | G01T 1/20188 |
| 11,609,347 B2* | 3/2023 | Iwakiri | ................. | G01T 1/2018 |
| 11,624,716 B2* | 4/2023 | Ushikura | .............. | G01T 1/2018 378/62 |
| 11,624,844 B2* | 4/2023 | Ushikura | ............ | G01T 1/20189 250/366 |
| 11,630,221 B2* | 4/2023 | Kato | ................... | G01T 1/20181 250/366 |
| 11,735,622 B2* | 8/2023 | Ushikura | ............ | G01T 1/20184 250/475.2 |
| 11,747,492 B2* | 9/2023 | Horiuchi | .............. | A61B 6/4283 250/369 |
| 11,786,194 B2* | 10/2023 | Okada | ................... | G01T 1/2018 250/366 |
| 11,802,980 B2* | 10/2023 | Kato | ................... | A61B 6/4283 |
| 11,852,756 B2* | 12/2023 | Bogumil | ........... | G01T 1/20188 |
| 11,860,323 B2* | 1/2024 | Kyushima | ........... | G01T 1/20188 |
| 11,988,786 B2* | 5/2024 | Bogumil | ........... | G01T 1/20188 |
| 11,996,434 B2* | 5/2024 | Kyushima | ................ | A61B 6/42 |
| 12,248,109 B2* | 3/2025 | Nakatsugawa | ....... | G01T 1/2018 |
| 12,399,287 B2* | 8/2025 | Shang | ................ | G01T 1/20189 |

FOREIGN PATENT DOCUMENTS

| | | |
|---|---|---|
| JP | 2020134274 A | 8/2020 |
| JP | 2021165654 A | 10/2021 |
| WO | 2018173893 A1 | 9/2018 |

* cited by examiner

RADIATION IMAGING APPARATUS COMPRISING A FLUORESCENT MEMBER, A FLEXIBLE SUBSTRATE, A SUPPORT BASE, A CONTROL BOARD, AND AN INTERPOSED MEMBER BETWEEN THE FLEXIBLE SUBSTRATE AND THE SUPPORT BASE

BACKGROUND OF THE DISCLOSURE

Field of the Disclosure

The present disclosure relates to a radiation imaging apparatus and a radiation imaging system.

Description of the Related Art

Radiation imaging apparatuses have been widely used in the field of industrial nondestructive inspection and of medical service. A radiation imaging apparatus produces a radiological image of an object by emitting radiation to the object and detecting the intensity distribution of the radiation that passes through the object. A digital radiation imaging apparatus has been developed in recent years. The digital radiation imaging apparatus includes a radiation detection panel that can produce and output digital radiological images instantly.

The substrate of the radiation detection panel included in the radiation imaging apparatus is normally made of glass. In recent years, a radiation imaging apparatus using a flexible and thin plastic film for the substrate has been proposed. The flexible plastic film is light weight and more durable against deformation compared with the glass substrate. The substrate made of the flexible plastic film can reduce the weight of the radiation imaging apparatus. Moreover, this can reduce the occurrence of malfunction caused by the deformation of the substrate, thereby improving the reliability of the radiation imaging apparatus.

In the radiation imaging apparatus, the radiation detection panel is connected to a control board, for example, using a flexible printed wiring board. In this case, if the radiation detection panel having flexibility is subjected to local deformation, a load may be concentrated on the connection section of the flexible printed wiring board, which may cause breakage of the connection section.

To solve this issue, International Publication No. 2018/173893 discloses a technique to reduce the local deformation by attaching a high-rigidity reinforcing member to the entire surface of the flexible substrate. International Publication No. 2018/173893 also discloses a technique to reduce the local deformation by sealing the gap between the edge portion of the radiation detection panel and the support base with a resin material.

SUMMARY OF THE DISCLOSURE

It is desirable, however, to reduce the deformation of the radiation detection panel without using the large reinforcing member described in International Publication No. 2018/173893 from the point of view of reducing the weight of the radiation imaging apparatus. Moreover, the radiation detection panel is vulnerable to deformation, and the radiation detection panel may deform even when a resin is injected to fill the gap as described in Japanese Patent Laid-Open No. 2020-134274. If the flexible substrate is fixed in a warped state, a load may be concentrated on the connection section between the flexible substrate and the flexible printed wiring board.

Accordingly, the present disclosure provides a radiation imaging apparatus that can reduce deformation of the edge portion of the radiation detection panel having flexibility.

According to an aspect of the present disclosure, a radiation imaging apparatus includes a radiation detection sensor, a support base, a bonding member, and a wiring member. The radiation detection sensor is configured to detect radiation and is formed using a flexible substrate. The support base supports radiation detection sensor. The bonding member bonds a first region of the radiation detection sensor to the support base. The first region is located in a central portion of the radiation detection sensor. The wiring member is connected to a predetermined edge portion of the radiation detection sensor. A second region is a region of the radiation detection sensor that includes the predetermined edge portion, and the second region opposes the support base but is not adhered to the support base.

Further features of the present disclosure will become apparent from the following description of exemplary embodiments with reference to the attached drawings.

DESCRIPTION OF THE EMBODIMENTS

First Embodiment

A radiation imaging apparatus 100 according to the present embodiment will be described with reference to the drawings.

Figure 1:
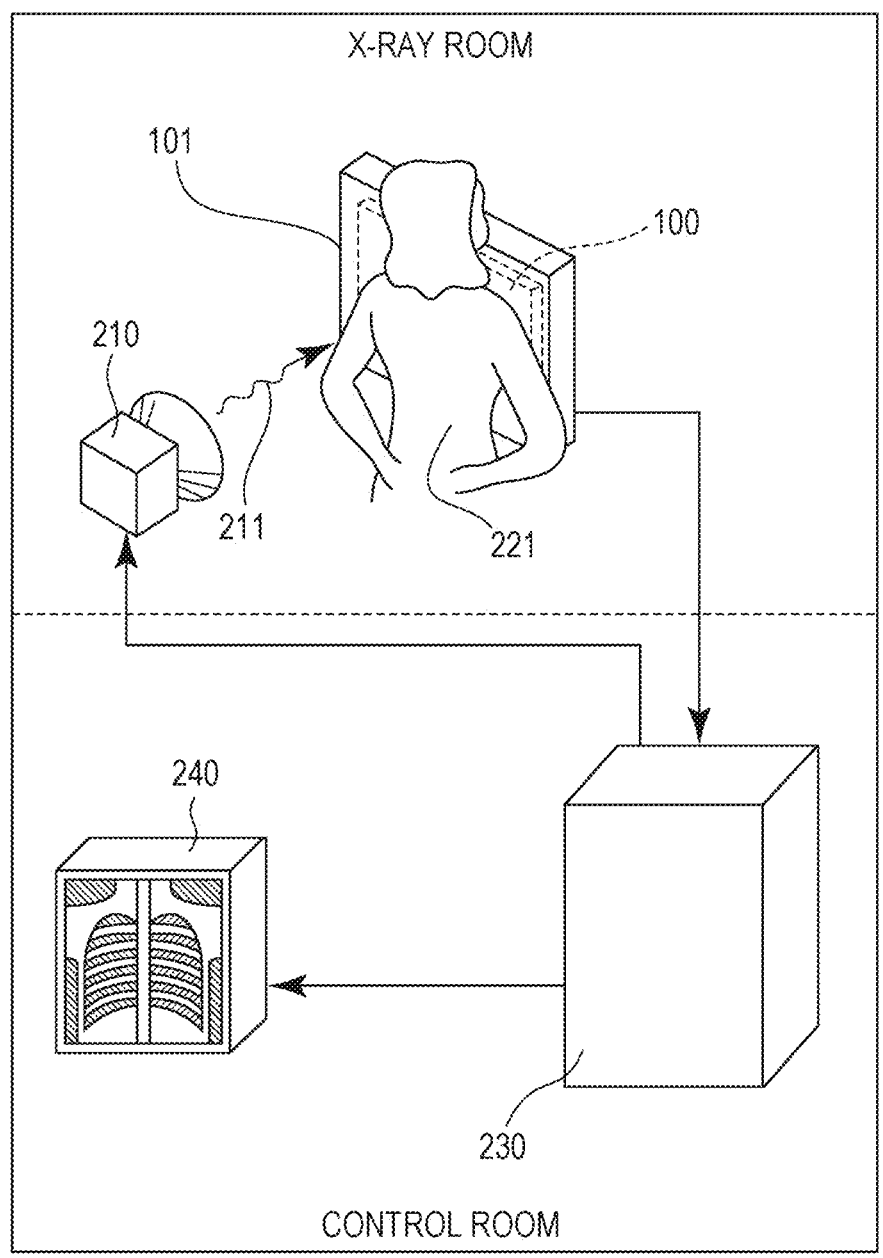
FIG. 1 is a schematic view illustrating a radiation imaging system according to a first embodiment.

FIG. 1 is a schematic view illustrating a radiation imaging system according to the present embodiment. The radiation imaging apparatus 100 is inserted in a holder 101 and is held at a position near an area of a subject 221 to be imaged. Radiation 211 generated by a radiation source 210 penetrates a target area of the subject 221 and is incident onto the radiation imaging apparatus 100. The incident radiation 211 is subsequently converted by the radiation imaging apparatus 100 into electric digital data, and the electric digital data is processed by a signal processing unit 230 and displayed on a display unit 240.

Figure 2A:
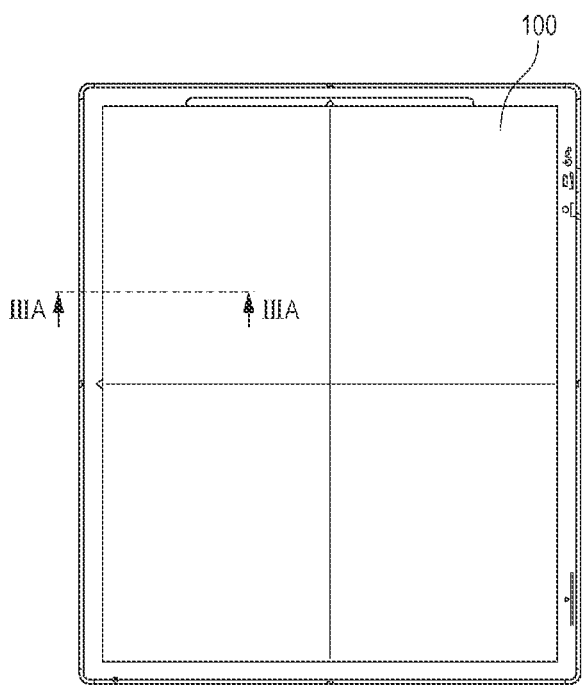
FIGS. 2A and 2B are views illustrating an exterior of the radiation imaging apparatus according to the first embodiment.
Figure 2B:
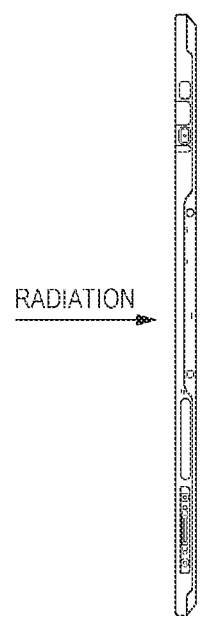
Figure 3A:
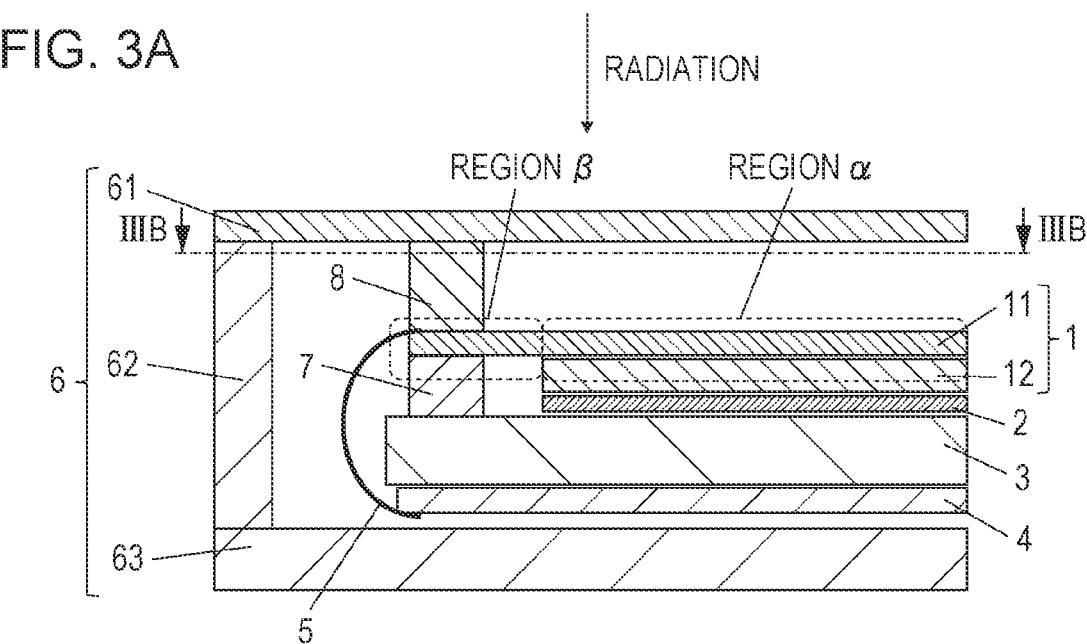
FIGS. 3A and 3B are views illustrating an internal structure of the radiation imaging apparatus according to the first embodiment.

FIGS. 2A and 2B are views illustrating an exterior of the radiation imaging apparatus 100 of the present embodiment. FIG. 2A is a front view of the radiation imaging apparatus 100 as viewed in the incident direction of the radiation, and FIG. 2B is a side view thereof. FIG. 3A is a cross-sectional view illustrating the radiation imaging apparatus 100 taken along line IIIA-IIIA in FIG. 2A.

Figure 3B:
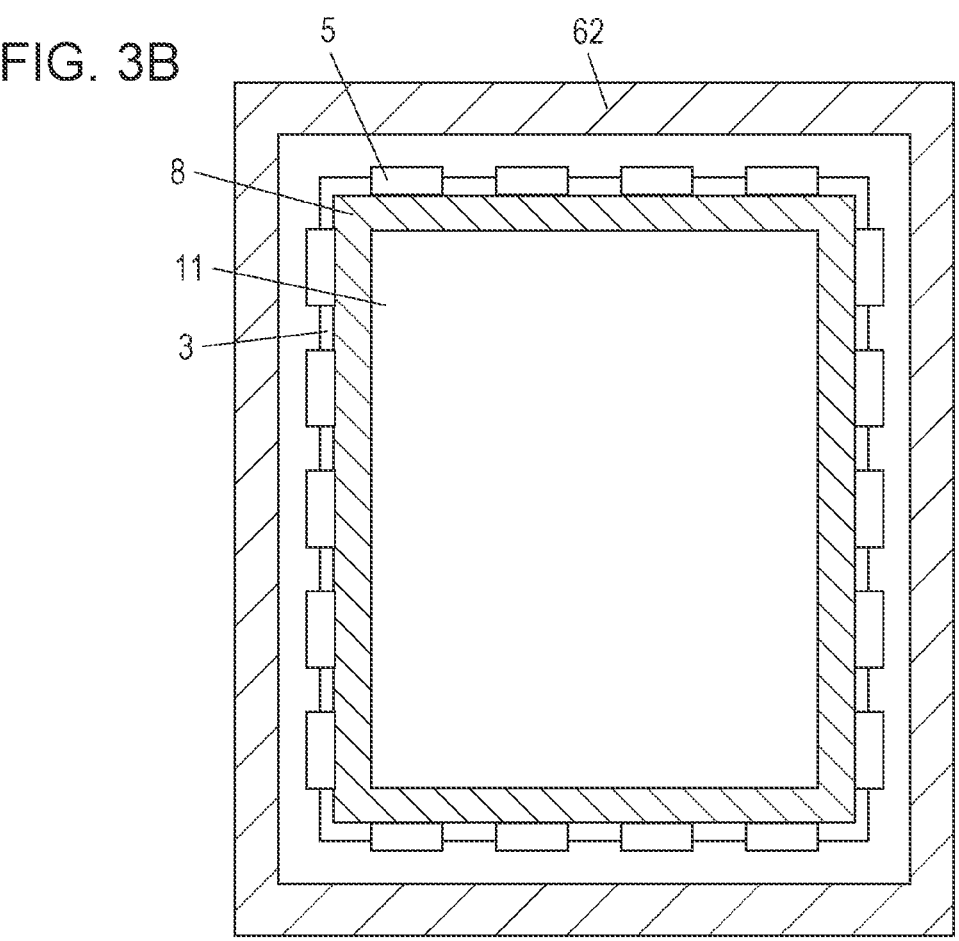

The radiation imaging apparatus 100 has a layer structure described below with reference to FIGS. 3A and 3B. FIG. 3B is a cross-sectional view of the radiation imaging apparatus 100 taken along line IIIB-IIIB in FIG. 3A.

According to the present embodiment, a radiation detection panel 1 of the radiation imaging apparatus 100 includes a flexible substrate 11 and a fluorescent member 12 disposed on the flexible substrate 11. The flexible substrate 11 includes photoelectric conversion elements (sensors) arrayed in a two-dimensional matrix. The radiation detection panel 1 employs a so-called indirect conversion technique.

More specifically, the radiation incident on the radiation imaging apparatus 100 is converted into light by the fluorescent member 12, and the light is subsequently converted into electric charges by the photoelectric conversion elements formed on the flexible substrate 11. An image is output at the end of processing. The fluorescent member 12 may be covered with a low-hygroscopic protection film to prevent the fluorescent member 12 from degrading due to moisture. For example, the fluorescent member 12 is made of cesium iodide (CsI) or gadolinium oxysulfide (GOS)

The radiation detection panel 1 is fixed to a support base 3 with an adhesive layer 2 interposed therebetween. It is desirable that the support base 3 be made of a high-rigidity material to prevent the radiation detection panel 1 from warping and suffering breakage. A control board 4 is disposed on a surface of the support base 3 that is opposite to the surface on which the radiation detection panel 1 is disposed. The control board 4 is connected to the radiation detection panel 1 via flexible printed wiring boards 5. These components are all accommodated in a housing 6.

The housing 6 includes a top plate 61, a bottom plate 63, and a frame 62 that connects the top plate 61 and the bottom plate 63 together. The top plate 61 is a plate that faces frontward and through which radiation enters, and the bottom plate 63 opposes the top plate 61 with the radiation detection panel 1 interposed therebetween.

In the following description, a central region of the radiation detection panel 1, in which the fluorescent member 12 is disposed, is referred to as a "region $\alpha$", and the other region, or the peripheral region, is referred to as a "region $\beta$" when the radiation detection panel 1 is viewed in the direction normal to the radiation incident surface. In the region $\beta$, the flexible substrate 11 is spaced from the support base 3 by the amount equal to the thickness of the fluorescent member 12 and the adhesive layer 2. An interposed member 7 is interposed between the flexible substrate 11 and the support base 3 in at least part of the region $\beta$, and the interposed member 7 supports the flexible substrate 11. An elastic member 8 is disposed on an inside wall of the housing 6 (i.e., the top plate 61). The elastic member 8 is disposed so as to be in contact with the flexible substrate 11 at a position opposite to the position at which the interposed member 7 is in contact with the flexible substrate 11. The elastic member 8 supports the flexible substrate 11.

If the radiation imaging apparatus 100 is subjected to vibration, the region $\alpha$ and the region $\beta$ move differently, which may cause local deformation of the radiation detection panel 1 in a boundary region between the region $\alpha$ and the region (3.

More specifically, the region a of the radiation detection panel 1 is fixed to the support base 3 by the adhesive layer 2, and the region $\alpha$ thereby follows the movement of the support base 3 during vibration. On the other hand, the region $\beta$ located near the edge of the radiation detection panel 1 follows the movement of the housing 6 if the rigidity of the interposed member 7 is lower than that of the elastic member 8. Accordingly, the region $\alpha$, which follows the movement of the support base 3, moves differently from the region $\beta$, which follows the movement of the housing 6. This may result in local deformation at the boundary.

Accordingly, it is necessary that the interposed member 7 have a rigidity higher than that of the elastic member 8. As a result, when the radiation detection panel 1 is subjected to vibration, both of the region a and the region $\beta$ follow the movement of the support base 3, which reduces the occurrence of the local deformation. For the same reason, it is desirable that the interposed member 7 be fixed to both the radiation detection panel 1 and the support base 3. On the other hand, it does not matter whether the elastic member 8 is fixed to the top plate 61 or not. However, it is desirable that the elastic member 8 be not fixed to, or be detachable from, the radiation detection panel 1 for the convenience of replacing a flexible printed wiring board 5 during maintenance operation.

For example, the material of the interposed member 7 and of the elastic member 8 may be a metal, a resin, or a foamed material. Note that the material or the shape is to be selected such that the rigidity of the interposed member 7 becomes higher than that of the elastic member 8 as described above. The interposed member 7 and the support base 3 may be made of separate members or may be made integrally. The elastic member 8 does not need to be made as one piece but may be made as separate pieces as is the example illustrated in FIG. 4B. The shape of each separated piece is not limited to what is illustrated in FIG. 4B. Moreover, as illustrated in FIG. 5B, the elastic member 8 may cover the radiation detection panel 1 entirely. This increases the volume of the elastic member 8. Accordingly, it is desirable that the elastic member 8 be made of a material having a low specific gravity, such as a foamed material, from a viewpoint of decreasing the weight of the radiation imaging apparatus 100.

The elastic member 8 may be disposed in a compressed state. This further improves the vibration resistance of the radiation detection panel 1.

Figure 4A:
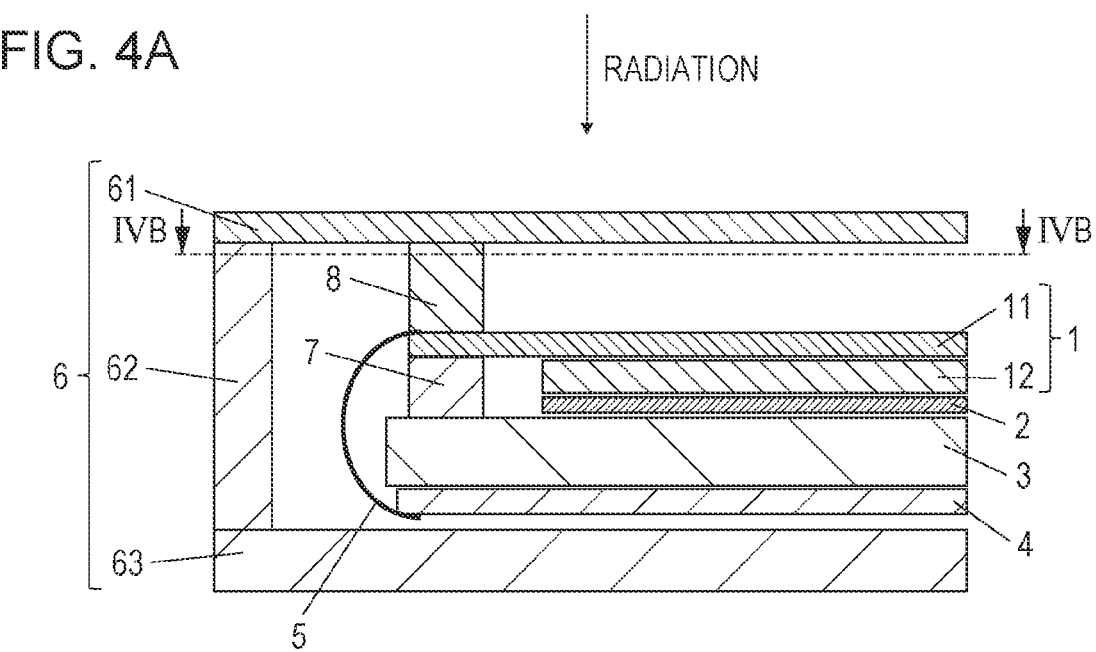
FIGS. 4A and 4B are views illustrating a modification of the internal structure of the radiation imaging apparatus according to the first embodiment.
Figure 4B:
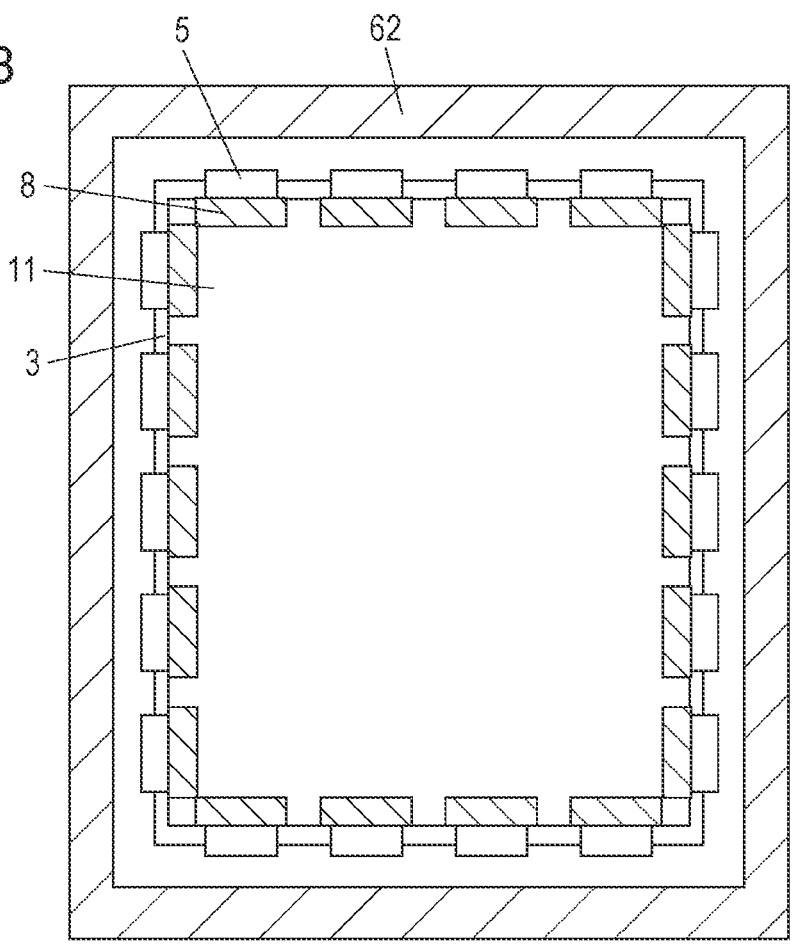
Figure 5A:
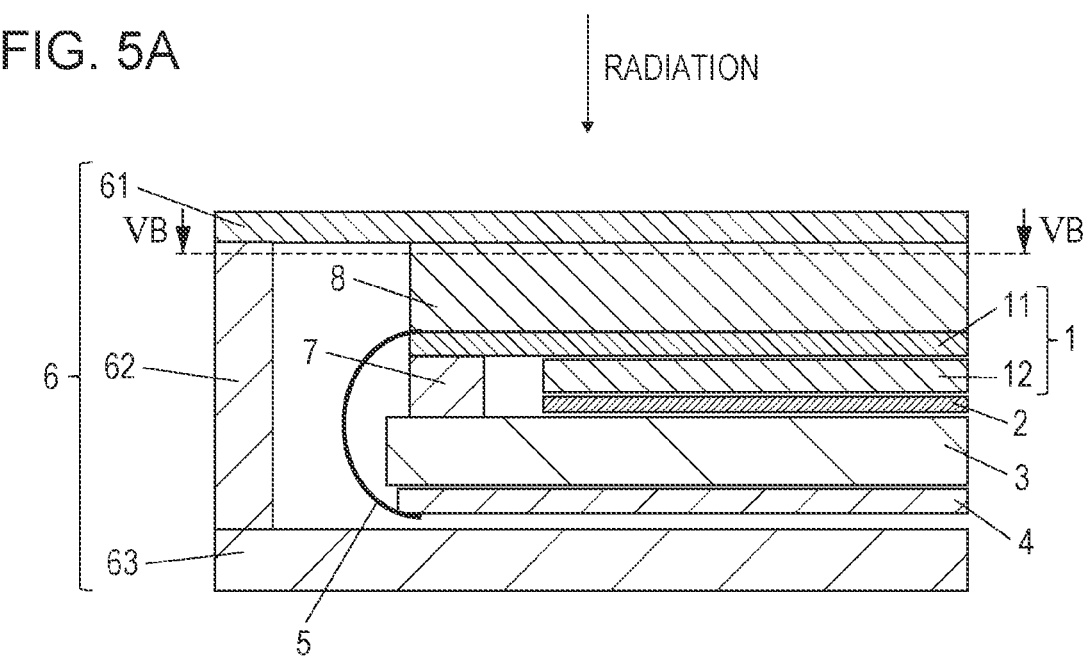
FIGS. 5A and 5B are views illustrating another modification of the internal structure of the radiation imaging apparatus according to the first embodiment.
Figure 5B:
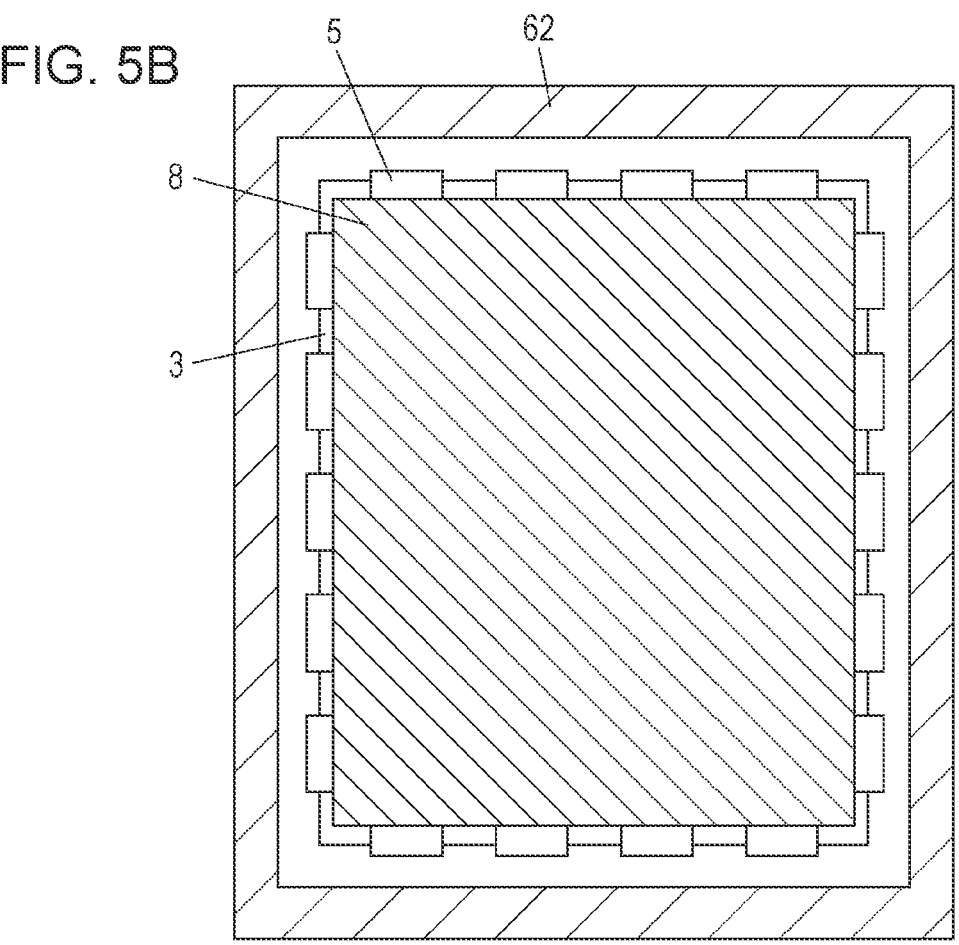
Figure 6:
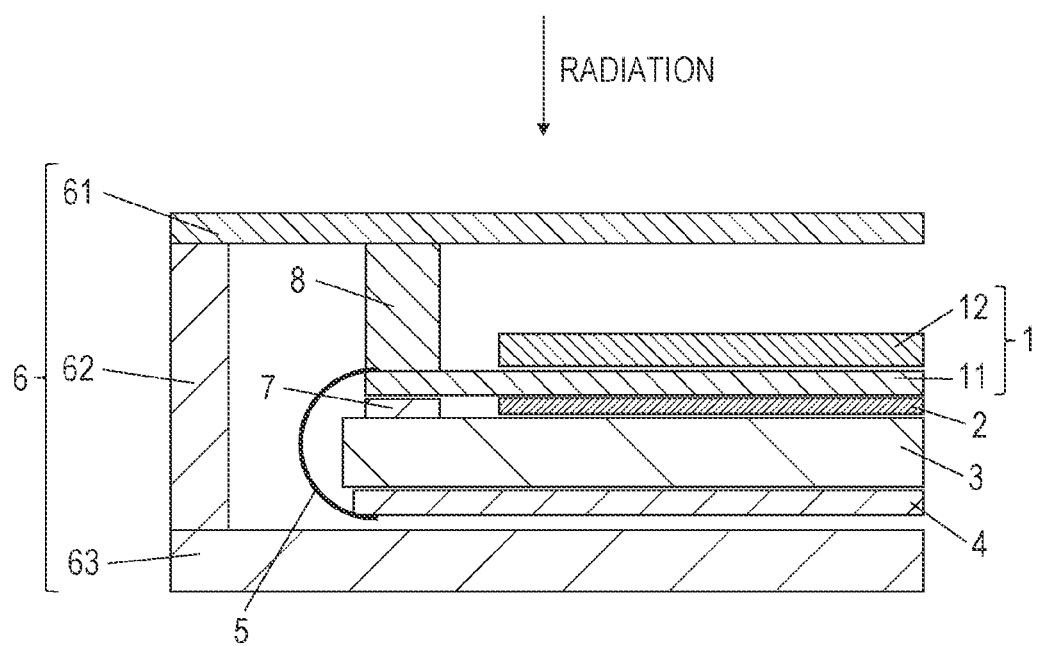
FIG. 6 is a view illustrating another modification of the internal structure of the radiation imaging apparatus according to the first embodiment.

The fluorescent member 12 may be installed on the radiation incident surface of the flexible substrate 11 as illustrated in FIG. 6, or alternatively, the fluorescent member 12 may be installed on the surface of the flexible substrate 11 opposite to the radiation incident surface as illustrated in FIGS. 3A, 4A, and 5A. The fluorescent member 12 may be installed both on the radiation incident surface and on the surface opposite to the radiation incident surface.

Figure 7:
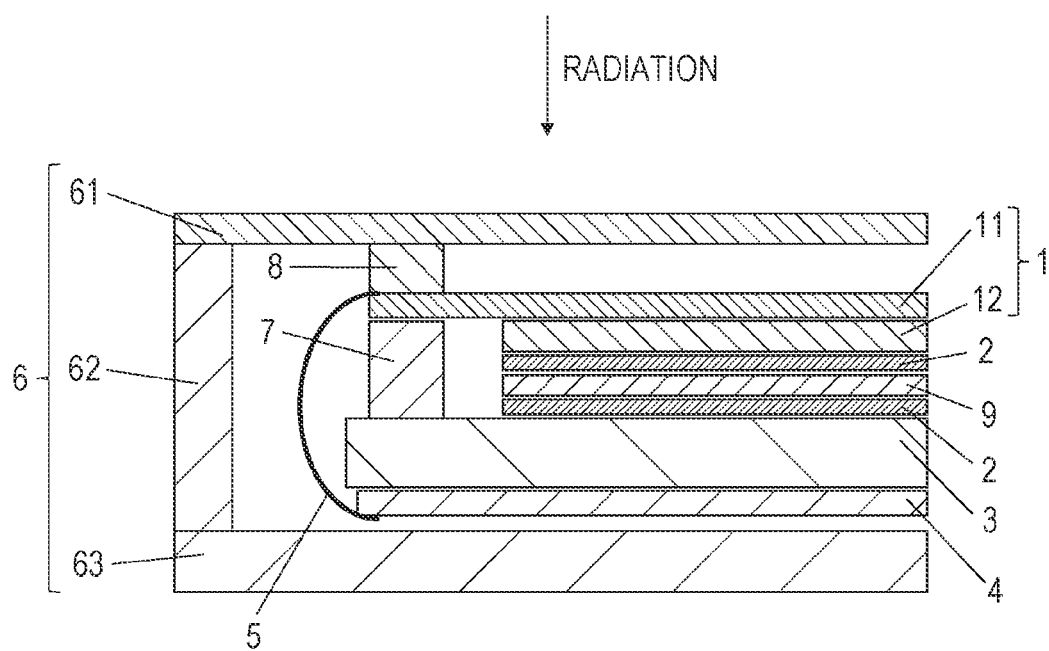
FIG. 7 is a view illustrating another modification of the internal structure of the radiation imaging apparatus according to the first embodiment.

In addition, as illustrated in FIG. 7, an additional member 9 may be disposed between the radiation detection panel 1 and the support base 3 and fixed thereto by respective adhesive layers 2. For example, the additional member 9 may be made of a shielding material having a radiation transmissivity lower than that of the flexible substrate 11 so as to absorb the radiation passing through the radiation detection panel 1. Alternatively, the additional member 9 may be a fluorescent plate that emits light in response to the radiation passing through the radiation detection panel 1.

In the example described above, the flexible printed wiring boards 5 are disposed at the four sides of the radiation detection panel 1. The flexible printed wiring boards 5 do not need to be disposed at the four sides. The radiation detection panel 1 may have a side at which no flexible printed wiring board 5 is disposed.

Second Embodiment

Figure 8:
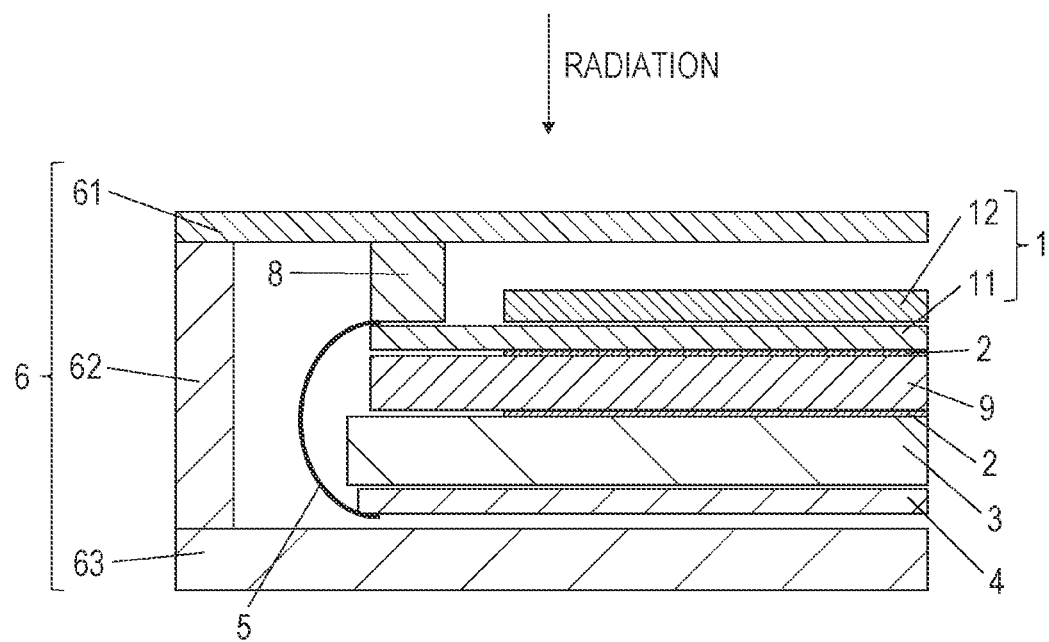
FIG. 8 is a view illustrating an internal structure of a radiation imaging apparatus according to a second embodiment.

A radiation imaging apparatus 100 according to a second embodiment will be described with reference to FIG. 8. Elements similar to those described in the first embodiment will not be described repeatedly.

In the second embodiment, the additional member 9 extends into the region β that is positioned near the edge of the radiation detection panel 1. In this case, the additional member 9 can serve concurrently as the interposed member 7 if the additional member 9 has a sufficient rigidity, if the adhesive layers 2 are thin enough, and if the gap between the additional member 9 and the radiation detection panel 1 and the gap between the additional member 9 and the support base 3 are small enough. In other words, the elastic member 8 and the additional member 9, which hold the edge portion of the radiation detection panel 1, can suppress local deformation of the edge portion of the radiation detection panel 1 during vibration.

The additional member 9 may be made of a shielding metal, such as stainless steel.

The embodiments and the modifications described above are merely examples and can be implemented in various other ways. The embodiments and the modifications may be subject to omission, replacement, and alteration of some elements without departing from the gist of the present disclosure.

Some features of the present disclosure related to the above-described embodiments are summarized in the following supplementary notes.

Supplementary Note 1

A radiation imaging apparatus includes a radiation detection panel, a housing, an elastic member, and an interposed member.

The radiation detection panel includes a scintillator configured to convert radiation into light and a flexible substrate in which multiple photoelectric conversion elements are formed, the photoelectric conversion elements being configured to convert the light into electric charges.

The housing accommodates the radiation detection panel.

The elastic member is disposed on an inside wall of the housing, and the elastic member is in contact with the substrate in at least part of a region of the radiation detection panel in which the scintillator is not formed as viewed in a direction normal to a radiation incident surface.

The interposed member supports a surface of the substrate in the region, the surface being opposite to the surface with which the elastic member is in contact.

In addition, the elastic member has a rigidity smaller than that of the interposed member.

Supplementary Note 2

In the radiation imaging apparatus, the elastic member may be disposed in a compressed state.

Supplementary Note 3

In the radiation imaging apparatus, the interposed member may be fixed to the substrate.

Supplementary Note 4

In the radiation imaging apparatus, the elastic member does not need to be fixed to the substrate.

Supplementary Note 5

In the radiation imaging apparatus, the scintillator may be disposed on at least one of a surface of the substrate on which radiation is incident and a surface of the substrate opposite to the radiation incident surface.

Supplementary Note 6

In the radiation imaging apparatus, the scintillator may be disposed both on the surface of the substrate on which radiation is incident and on the surface of the substrate opposite to the radiation incident surface.

Supplementary Note 7

The radiation imaging apparatus may further include a shielding member having a radiation transmissivity lower than that of the substrate.

The shielding member may be disposed on the surface of the substrate that is opposite to the radiation incident surface.

Supplementary Note 8

The radiation imaging apparatus may further include a fluorescent plate that receives radiation and thereby emits light.

The fluorescent plate may be disposed on the surface of the substrate opposite to the radiation incident surface.

Supplementary Note 9

In the radiation imaging apparatus, the elastic member may be disposed so as to cover the radiation detection panel entirely as viewed in the direction normal to the radiation incident surface.

Supplementary Note 10

In the radiation imaging apparatus, a flexible printed wiring board may connect a control board that processes signals from the radiation detection panel to the radiation incident surface of the substrate.

Supplementary Note 11

A radiation imaging system includes a radiation source configured to generate radiation and a radiation imaging apparatus according to any one of the supplementary notes 1 to 10 above.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-172600, filed Oct. 27, 2022, which is hereby incorporated by reference herein in its entirety.

What is claimed is:

1. A radiation imaging apparatus comprising:
   a radiation detection sensor including a flexible substrate configured to detect radiation;
   a support base supporting the radiation detection sensor;
   a bonding member that bonds a first region of the radiation detection sensor to the support base, the first region being located in a central portion of the radiation detection sensor; and
   a wiring member connected to a predetermined edge portion of the radiation detection sensor,
   wherein a second region is a region of the radiation detection sensor that includes the predetermined edge portion, and
   wherein the second region opposes the support base but is not adhered to the support base.

2. The radiation imaging apparatus according to claim 1, further comprising:
   a holding mechanism holding opposite surfaces of the second region of the radiation detection sensor.

3. The radiation imaging apparatus according to claim 2, wherein the holding mechanism includes
   a first abutting member abutting a surface of the radiation detection sensor, the surface facing the support base, and
   a second abutting member abutting a surface of the radiation detection sensor, the surface being opposite to the surface facing the support base.

4. The radiation imaging apparatus according to claim 3, wherein the first abutting member is fixed to the support base.

5. The radiation imaging apparatus according to claim 3, wherein the first abutting member is not fixed to the support base.

6. The radiation imaging apparatus according to claim 3, further comprising:
   a housing accommodating the radiation detection sensor, the support base, the bonding member, and the wiring member, the housing including a top member through which radiation is incident on the radiation detection sensor,
   wherein the second abutting member is fixed to the top member.

7. The radiation imaging apparatus according to claim 3, further comprising
   a housing accommodating the radiation detection sensor, the support base, the bonding member, and the wiring member, the housing including a top member through which radiation is incident on the radiation detection sensor,
   wherein the second abutting member is not fixed to the top member.

8. The radiation imaging apparatus according to claim 3, wherein the first abutting member is made of a metal, a resin, or a foamed material.

9. The radiation imaging apparatus according to claim 8, wherein the first abutting member has a rigidity higher than that of the second abutting member.

10. The radiation imaging apparatus according to claim 3, wherein the second abutting member is made of a metal, a resin, or a foamed material.

11. The radiation imaging apparatus according to claim 3, wherein the second abutting member is an elastic member pressing the radiation detection sensor toward the first abutting member.

12. The radiation imaging apparatus according to claim 1, further comprising: a scintillator layer is formed on one of opposite surfaces of the radiation detection sensor, but the scintillator layer is not formed in the second region.

13. The radiation imaging apparatus according to claim 1, the bonding member includes multiple layers.

14. The radiation imaging apparatus according to claim 1, the flexible substrate is a thin plastic film.

15. The radiation imaging apparatus according to claim 1, the wiring member is a chip-on-film (COF) device.

* * * * *